United States Patent
Laaksonen et al.

(10) Patent No.: US 12,079,393 B2
(45) Date of Patent: Sep. 3, 2024

(54) TACTILE FEEDBACK

(71) Applicant: Nokia Technologies Oy, Espoo (FI)

(72) Inventors: Lasse Juhani Laaksonen, Tampere (FI); Miikka Tapani Vilermo, Siuro (FI); Arto Juhani Lehtiniemi, Lempäälä (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/301,480

(22) Filed: Apr. 17, 2023

(65) Prior Publication Data
US 2023/0359278 A1    Nov. 9, 2023

(30) Foreign Application Priority Data
May 5, 2022    (EP) .................................... 22171833

(51) Int. Cl.
*G06F 3/01*    (2006.01)
*G06F 3/041*    (2006.01)

(52) U.S. Cl.
CPC ............ *G06F 3/016* (2013.01); *G06F 3/0416* (2013.01); *G06F 3/04186* (2019.05); *G06F 2203/04101* (2013.01); *G06F 2203/04104* (2013.01)

(58) Field of Classification Search
CPC .... G06F 3/016; G06F 3/0416; G06F 3/04186; G06F 2203/04101; G06F 2203/04104
See application file for complete search history.

(56) References Cited

U.S. PATENT DOCUMENTS

| | | | | |
|---|---|---|---|---|
| 6,888,536 B2 * | 5/2005 | Westerman | ........... | G06F 3/0488 345/184 |
| 8,232,976 B2 | 7/2012 | Yun et al. | | |
| 8,363,019 B2 * | 1/2013 | Cho | .................... | G06F 3/04845 715/204 |
| 8,593,398 B2 | 11/2013 | Ollila et al. | | |
| 8,677,287 B2 * | 3/2014 | Shimotani | ........... | G06F 3/04886 345/660 |
| 9,092,129 B2 * | 7/2015 | Abdo | .................. | G06F 3/04883 |
| 9,092,135 B2 * | 7/2015 | Chen | ..................... | G06T 19/006 |
| 9,223,403 B2 * | 12/2015 | Araki | .................. | G06F 3/04883 |

(Continued)

FOREIGN PATENT DOCUMENTS

WO    2014/125165 A1    8/2014

OTHER PUBLICATIONS

Liubun et al., "Hover Signal-Profile Detection", IEEE 15th International Conference on Computer Sciences and Information Technologies (CSIT), Sep. 23-26, 2020, pp. 7-10.

(Continued)

*Primary Examiner* — Michael J Jansen, II
(74) *Attorney, Agent, or Firm* — Harrington & Smith

(57) ABSTRACT

An apparatus, method and computer program is described comprising: detecting one or more parts of a hand of a user within a first defined distance of a touch sensitive tactile display; determining based, at least in part, on the detected parts of the hand of the user, an expected type of user interaction with the display, including determining an expected number of parts (e.g. digits or fingers) of the hand that will make contact with the display as part of the expected type of user interaction; and providing tactile feedback to the user when the user makes contact with the display dependent, at least in part, on the expected type of user interaction.

20 Claims, 10 Drawing Sheets

(56) References Cited

U.S. PATENT DOCUMENTS

| | | | |
|---|---|---|---|
| 9,225,810 B2* | 12/2015 | Jingushi | H04B 1/3827 |
| 10,203,873 B2 | 2/2019 | Marsden | |
| 10,353,478 B2 | 7/2019 | Xu et al. | |
| 10,732,759 B2* | 8/2020 | Hinckley | G06F 3/0482 |
| 10,884,559 B2* | 1/2021 | Xu | G06F 3/04186 |
| 10,908,686 B2* | 2/2021 | Ramsay | G06F 3/016 |
| 10,963,089 B2* | 3/2021 | Murakami | G06F 3/041 |
| 11,615,884 B2* | 3/2023 | Stoyanov | G06V 20/41 |
| | | | 434/262 |
| 2002/0015024 A1* | 2/2002 | Westerman | G06F 3/0446 |
| | | | 345/173 |
| 2009/0303199 A1* | 12/2009 | Cho | G06F 3/04845 |
| | | | 345/173 |
| 2011/0234639 A1* | 9/2011 | Shimotani | G01C 21/3664 |
| | | | 345/661 |
| 2011/0248941 A1* | 10/2011 | Abdo | G06F 3/0488 |
| | | | 345/173 |
| 2012/0056825 A1* | 3/2012 | Ramsay | G06F 3/016 |
| | | | 345/173 |
| 2012/0110447 A1* | 5/2012 | Chen | G06F 3/0412 |
| | | | 345/173 |
| 2014/0011547 A1* | 1/2014 | Jingushi | H04B 1/3827 |
| | | | 455/566 |
| 2014/0168110 A1* | 6/2014 | Araki | G06F 3/04847 |
| | | | 345/173 |
| 2014/0225860 A1* | 8/2014 | Aono | G06F 3/04883 |
| | | | 345/174 |
| 2014/0359410 A1 | 12/2014 | Lee | |
| 2014/0368455 A1* | 12/2014 | Croisonnier | G06F 3/045 |
| | | | 345/173 |
| 2017/0153741 A1* | 6/2017 | Ofek | G06F 3/0416 |
| 2018/0004386 A1* | 1/2018 | Hinckley | G06F 3/0416 |
| 2018/0356891 A1* | 12/2018 | Murakami | G06F 3/041 |
| 2019/0196591 A1* | 6/2019 | Long | G02B 27/0172 |
| 2019/0243489 A1* | 8/2019 | Xu | G06F 3/04186 |
| 2019/0279524 A1* | 9/2019 | Stoyanov | G16H 40/63 |

OTHER PUBLICATIONS

Onishi et al., "Predicting touch operations by using hover information in smartphones for data prefetching", IEEE International Conference on Multimedia & Expo Workshops (ICMEW), Jul. 11-15, 2016, 6 pages.

Extended European Search Report received for corresponding European Patent Application No. 22171833.1, dated Oct. 20, 2022, 11 pages.

* cited by examiner

TACTILE FEEDBACK

FIELD

The present specification relates to the provision of tactile feedback to a user using a touch sensitive tactile display.

BACKGROUND

The provision of touch sensitive tactile displays for providing user feedback is known. There remains a need for further developments in this field.

SUMMARY

In a first aspect, this specification describes an apparatus comprising means for performing: detecting one or more parts (e.g. one or more digits or fingers) of a hand of a user within a first defined distance of a touch sensitive tactile display; determining based, at least in part, on the detected parts of the hand of the user, an expected type of user interaction with the display (i.e. with the touch sensitive tactile display), including determining an expected number of parts (e.g. digits or fingers) of the hand that will make contact with the tactile display as part of the expected type of user interaction; and providing tactile feedback (e.g. using display vibrations) to the user when the user makes contact with the display dependent, at least in part, on the expected type of user interaction. The said one or more parts of the hand of the user may comprise one or more digits or fingers of the hand of the user. Alternatively, or in addition, the said one or more parts of the hand of the user may comprise a side of a palm or a wrist.

The apparatus may further comprise means for performing: detecting contact with the display by the hand of the user; and determining a type of user interaction of the detected contact.

The means for providing tactile feedback may be configured to provide said tactile feedback in response to the detection of contact with the display by the hand of the user. Alternatively, or in addition, the means for providing tactile feedback to the user may be configured to provide tactile feedback in the event that the expected type of user interaction matches the determined type of user interaction. Alternatively, or in addition, the means for providing tactile feedback to the user may be configured to provide tactile feedback indicative of a mismatch in the event that the determined type of user interaction does not match the expected type of user interaction.

In some example embodiments, the apparatus may further comprise means for performing: entering a wait state in the event that the determined type of user interaction does not match the expected type of user interaction. The apparatus may further comprise means for performing: exiting the wait state in the event that the determined type of user interaction changes to match the expected type of user interaction. In some example embodiments, no tactile feedback is provided to the user in the wait state. In some alternative embodiments, a pre-defined type of feedback may be provided in the wait state (thereby communicating to the user that the detected type of user interaction does not match the expected type of user interaction).

The apparatus may further comprise means for performing: resetting the expected type of user interaction. The said means for performing resetting the expected type of user interaction may comprise means for performing: determining that the one or more parts of the hand of the user are positioned beyond a second defined distance from the touch sensitive tactile display. In some embodiments, the first and second defined distances are the same; in other example embodiments, the first and second defined distances are different.

In some example embodiments, the type of user interaction (or the expected type of user interaction) relates to a control function (e.g. relating to control of a user device, such as a user device of which the display is a part).

The said means for performing detecting one or more parts of the hand of the user within the first defined distance of the touch sensitive tactile display comprises one or more of: at least one a hover sensor; at least one LIDAR sensor; at least one millimetre wave sensor; and/or at least one camera.

In the first aspect described above, the said means may comprise: at least one processor; and at least one memory including computer program code, the at least one memory and computer program code configured to, with the at least one processor, cause the performance of the apparatus.

In a second aspect, this specification describes a method comprising: detecting one or more parts of a hand of a user within a first defined distance of a touch sensitive tactile display; determining based, at least in part, on the detected parts of the hand of the user, an expected type of user interaction with the display, including determining an expected number of parts (e.g. digits or fingers) of the hand that will make contact with the tactile display as part of the expected type of user interaction; and providing tactile feedback (e.g. using display vibrations) to the user when the user makes contact with the display dependent, at least in part, on the expected type of user interaction. The said one or more parts of the hand of the user may comprise one or more digits of the hand of the user. Alternatively, or in addition, the said one or more parts of the hand of the user may comprise a side of a palm or a wrist.

The method may further comprise: detecting contact with the display by the hand of the user; and determining a type of user interaction of the detected contact.

The said tactile feedback may be provided: in response to the detection of contact with the display by the hand of the user; in the event that the expected type of user interaction matches the determined type of user interaction; and/or to provide tactile feedback indicative of a mismatch in the event that the determined type of user interaction does not match the expected type of user interaction.

Some example embodiments further comprise entering a wait state in the event that the determined type of user interaction does not match the expected type of user interaction. Some example embodiments further comprise exiting the wait state in the event that the determined type of user interaction changes to match the expected type of user interaction. In some example embodiments, no tactile feedback is provided to the user in the wait state. In other example embodiments a pre-defined type of feedback may be provided in the wait state (thereby communicating to the user that the detected type of user interaction does not match the expected type of user interaction).

Some example embodiments further comprise resetting the expected type of user interaction. For example, resetting the expected type of user interaction may comprise determining that the one or more parts of the hand of the user are positioned beyond a second defined distance (which may be the same as, or different to, the first defined distance) from the touch sensitive tactile display.

In some example embodiments, the type of user interaction (or the expected type of user interaction) relates to a control function.

In a third aspect, this specification describes computer-readable instructions which, when executed by a computing apparatus, cause the computing apparatus to perform (at least) any method as described with reference to the second aspect.

In a fourth aspect, this specification describes a computer-readable medium (such as a non-transitory computer-readable medium) comprising program instructions stored thereon for performing (at least) any method as described with reference to the second aspect.

In a fifth aspect, this specification describes an apparatus comprising: at least one processor; and at least one memory including computer program code which, when executed by the at least one processor, causes the apparatus to perform (at least) any method as described with reference to the second aspect.

In a sixth aspect, this specification describes a computer program comprising instructions for causing an apparatus to perform at least the following: detect one or more parts of a hand of a user within a first defined distance of a touch sensitive tactile display; determine based, at least in part, on the detected parts of the hand of the user, an expected type of user interaction with the display, including determining an expected number of parts (e.g. digits or fingers) of the hand that will make contact with the display as part of the expected type of user interaction; and provide tactile feedback to the user when the user makes contact with the display dependent, at least in part, on the expected type of user interaction.

In a seventh aspect, this specification describes a sensor (or some other means) for detecting one or more parts of a hand (e.g. one or more digits) of a user within a first defined distance of a touch sensitive tactile display; a processor (or some other means) for determining based, at least in part, on the detected parts of the hand of the user, an expected type of user interaction with the display, including determining an expected number of parts (e.g. digits or fingers) of the hand that will make contact with the display as part of the expected type of user interaction; and an output (or some other means) for providing tactile feedback (e.g. using display vibrations) to the user when the user makes contact with the display dependent, at least in part, on the expected type of user interaction. The said sensor may comprise one or more of at least one hover sensor; at least one LIDAR sensor; at least one millimetre wave sensor; and/or at least one camera. The said output may be an output for controlling a tactile audio display, or similar device.

BRIEF DESCRIPTION OF THE DRAWINGS

Example embodiments will now be described, by way of example only, with reference to the following schematic drawings, in which.

DETAILED DESCRIPTION

Figure 1:
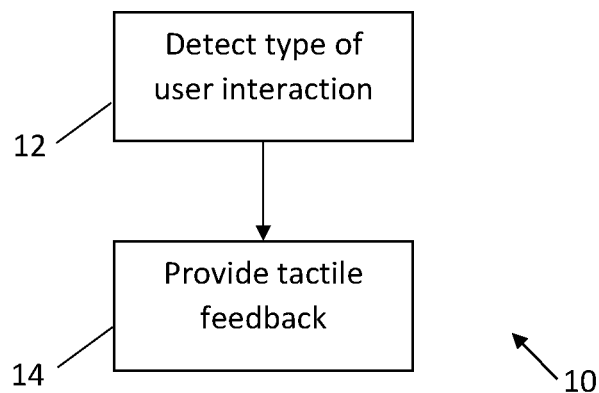
FIG. 1 is a flow chart showing an algorithm in accordance with an example embodiment.

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

FIG. 1 is a flow chart showing an algorithm, indicated generally by the reference numeral 10, in accordance with an example embodiment.

The algorithm 10 starts at operation 12, where a type of user interaction with a user device is detected. As discussed in detail below, the operation 12 may include detecting one or more digits (e.g. fingers) of a hand of a user within a first defined distance (e.g. a hover distance) of a touch sensitive tactile display (such as a tactile audio display).

Then, at operation 14, tactile feedback is provided to the user dependent, at least in part, on the expected type of user interaction. As discussed further below, different tactile feedbacks may be indicative of different modes of operation of a system.

As discussed in detail below, the operation 12 may be implemented when the relevant user digit(s) (e.g. finger(s)) are separated from the user device (e.g. by a "hover" distance) and the operation 14 may be implemented when the user makes contact with the display.

Moreover, the algorithm 10 may be used to detect other parts of a hand of a user (e.g. a side of a palm or the wrist) in addition to, or instead of, said one or more digits.

Figure 2:
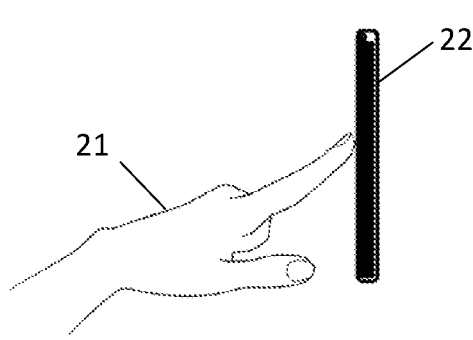
FIGS. 2 and 3 show a user device being used in accordance with example embodiments.
Figure 3:
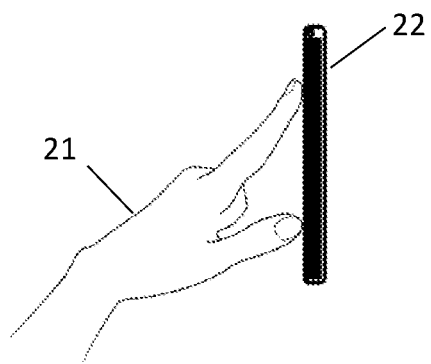

FIGS. 2 and 3 show a user device 22 being used in accordance with example embodiments. Specifically, FIG. 2 shows the user device 22 receiving a single-digit user interaction from a hand 21 of a user and FIG. 3 shows the user device receiving a two-digit user interaction from the hand 21 of a user.

The user device 22 may be used to implement the algorithm 10 described above.

The user device 22 may include a tactile display, for example using tactile audio display (TAD) technology.

TAD is an electronic device display that is capable of producing vibrations in addition to displaying visual content. The vibrations are typically achieved using piezo or electromagnetic actuators beneath the display allowing for the display elements to vibrate according to a control signal (which control signal may be an output of the algorithm 10). The vibrations can be used to create sound audible to a user or tactile feedback perceptible to a user who touches the display surface.

Tactile audio display (and other tactile displays) can be used to provide a sensation that is perceptible to the user. For example, such a display may be used to reproduce a tactile feedback that resembles that of an object, such as shape, its surface texture, roughness, or temperature.

TAD technology is also relevant for audio reproduction. For example, a traditional earpiece on a mobile phone can in some examples be replaced by a vibrating screen (TAD) that generates the sound perceivable to the user. These devices may belong to the HaNTE (Handsets featuring Non-Traditional Earpieces) device category. Another name for a sound-producing TAD may be a "singing display".

In addition to mobile phones, tactile displays have recently gained popularity also in larger electronic devices such as tablets, TVs, monitors, etc. Other good application areas for the principles described herein include automotive infotainment systems and various touchscreens and tactile control panels that may or may not be used to also generate audio output.

It is possible to use a tactile display to produce different sensation for the user, e.g., based on which part of the display the user touches and/or what functionality the display part the user touches corresponds to. This allows for two things:

- The user can be provided with touch feedback that the user is triggering the intended functionality, selection, etc. (or conversely, that the user is not triggering the intended functionality, selection, etc.).
- The user can receive the desired feedback and confirmation without relying on visual or audio feedback.

Thus, a user can be provided with feedback while controlling a device (or otherwise interacting with a display-based user interface). This may allow user to conveniently use a device without looking at it or at any other display.

Figure 4:
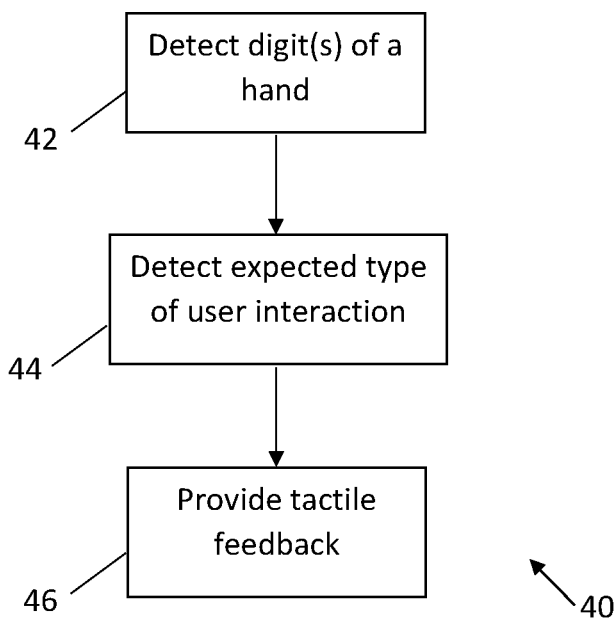
FIG. 4 is a flow chart showing an algorithm in accordance with an example embodiment.

FIG. 4 is a flow chart showing an algorithm, indicated generally by the reference numeral 40, in accordance with an example embodiment.

The algorithm 40 starts at operation 42, where one or more digits (or some other part) of a hand of a user within a first defined distance (e.g. a "hover" distance) of a touch sensitive tactile display are detected.

At operation 44, a determination is made, based, at least in part, on the parts of the hand detected in the operation 42, of an expected type of user interaction with the display. For example, as discussed further below, the operation 44 may include determining an expected number of digits of the hand that will make contact with the tactile display as part of the expected type of user interaction, although, as discussed above, alternatives such as detecting a side or a palm or a wrist of the user are possible. The operation 44 may be based on detecting a number of extended digits of the hand of the user detected within said first defined distance (in the operation 42). Alternatively, or in addition, the said one or more parts of the hand of the user may comprise a side of a palm or a wrist Finally, at operation 46, tactile feedback is provided to the user dependent, at least in part, on the expected type of user interaction. Thus, for example, different tactile feedbacks may be indicative of different modes of operation. Whilst the operations 42 and 44 may be implemented at the "hover" distance, the operation 46 may executed when the user is touching the display. Note, however, that in some embodiments, the operation 46 may be implemented before contact is made (although that tactile feedback may not, in some example embodiments, be apparent to the user until contact is made).

Figures 5, 6:
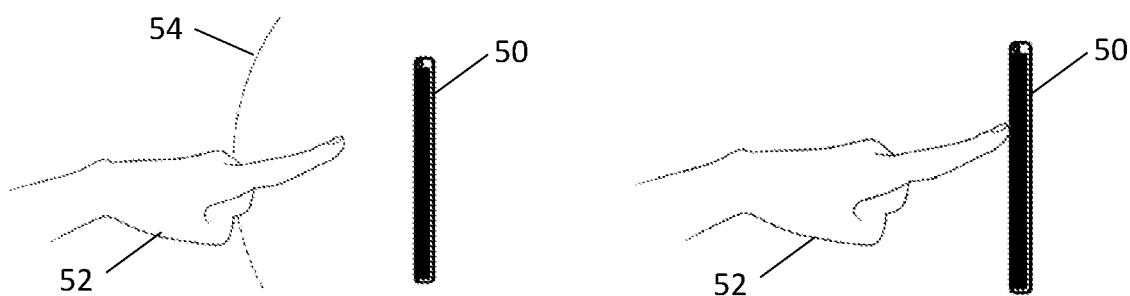
FIGS. 5 to 8 show a user device being used in accordance with example embodiments.
Figures 7, 8:
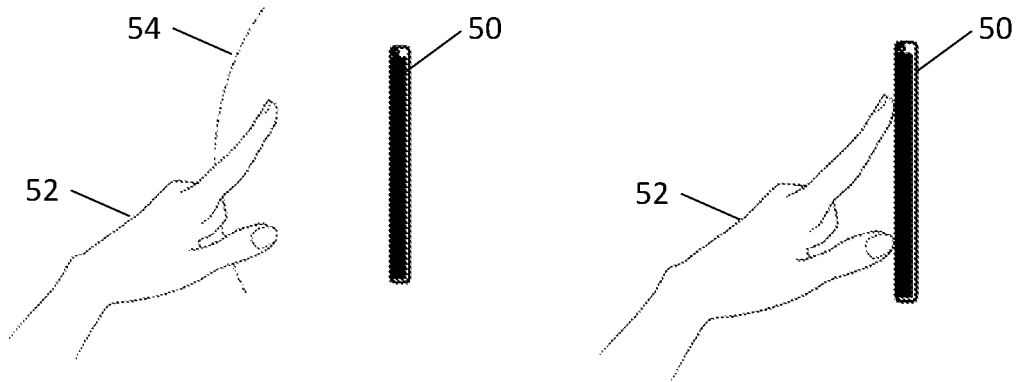

FIGS. 5 to 8 show a user device 50 being used in accordance with example embodiments. The user device 50 may be used to implement the algorithm 40 described above. More specifically, FIGS. 5 and 6 show a first example use of the user device 50 and FIGS. 7 and 8 show a second example use of the user device 50.

FIG. 5 shows a hand 52 of a user approaching the user device 50. The hand 52 has an extended forefinger, providing a one-finger gesture. In an implementation of the operation 42, the extended forefinger (a digit of the user) is detected passing within a first defined distance 54 of a display of the user device. The first defined distance may be a "hover distance" as discussed elsewhere in this document. The display of the user device 50 may be a touch sensitive tactile display, such as a tactile audio display (TAD).

In response to the detection of the extended digit of the hand 52 in the operation 42, an incoming one-finger gesture is detected and an expected type user interaction based on a one-finger contact is detected in the operation 44.

As shown in FIG. 6, the user hand moves such that the finger makes contact with the user device 50. As a result, tactile feedback in line with the one-finger feedback mode is provided as an initial feedback mode (thereby implementing the operation 46 of the algorithm 40).

FIG. 7 shows the hand 52 of a user approaching the user device 50. In this example, the hand 52 has an extended forefinger and an extended thumb, providing a two-digit gesture. In an implementation of the operation 42, the two-digit gesture is detected passing within the first defined distance 54 (the hover distance) of a display of the user device.

In response to the detection of the two-digit gesture in the operation 42, an expected type of user interaction based on a two-finger contact is detected in the operation 44.

As shown in FIG. 8, the user hand moves such that the finger and thumb make contact with the user device 50. As a result, tactile feedback in line with the two-digit feedback mode is provided as an initial TAD feedback mode (thereby implementing the operation 46 of the algorithm 40).

In example cases described above with reference to FIGS. 5 to 8, the system allows a user to enter a device mode or functionality based on a number of fingers/digits touching the screen together at the same time. The user thus receives the correct tactile feedback (in the operation 46) and understands the correct mode/functionality is active. This can be useful, for example, if a user is not even looking at the screen of the user device 50. An example of this might be a touchscreen input on a control panel of a car, where the driver may wish to control certain functionalities without looking away from the traffic. In cars, digital interfaces are increasingly common user interfaces (UIs) for various reasons, including often being cheaper than high-quality mechanical interfaces.

FIGS. 5 and 6 show a first (one finger) user interaction and FIGS. 7 and 8 show a second (two digit) user interaction. The type of user interaction may relate to a control function. Thus, for example, different contacts (e.g. one, two, three or more digits) may trigger different control functions. By way of example, a camera may have a first mode to change a focus point (controlled by a single finger) and a second mode to control a zoom level (e.g. controlled by "pinching" using two finger, or a finger and thumb). These modes may be activated using a different number of finger contacts with the display.

The user device 50 may comprise a hover sensor for detecting one or more digits of a hand within the first defined distance 54 (or some other distance, as discussed further below) of the display of the user device 50. Alternative arrangements are possible, for example the hover sensor may be replaced with a LIDAR sensor, a millimetre wave sensor or one or more cameras. By way of example, a LIDAR sensor may be implemented by detecting the period of time for a laser to be reflected back to the LIDAR sensor at the user device from a digit of the hand. The skilled person will be aware of other sensors that could be used to detect said one or more digits of the hand within the first defined distance 54.

As discussed above, the user device 50 may be a tactile audio display (TAD). The display may provide feedback in the form of display vibrations. Alternative displays are, however, possible, such as any other touch-sensitive displays and controls that are capable of providing user-perceptible sensations upon touch.

In the algorithm 40, a user's intended touch "pattern" (e.g., one-digit touch, multi-digit touch) can be detected prior to user actually touching the device screen. The user device detects user's hand approaching it at a "hover distance", and during the "hover" detects the incoming gesture. Based on the detected gesture, the device can select a default operation mode and corresponding touch feedback that is different between the touch modes and operations. Upon first contact, the device begins to provide the touch feedback according to the initially detected gesture; this feedback may, in some example embodiments, be provided regardless of the actual number of fingers touching the screen at that time instance.

For example, the user device 50 may detect during a hover that the hand 52 of a user is approaching with two fingers. The user device 50 now expects two-finger touch and the control mode is selected accordingly. In the event that the user's hand 52 approaches and a first finger touches screen, the user device 50 may begin to provide two-finger feedback (and may not yet otherwise respond to touch by, e.g., providing the control corresponding to one-finger touch), since a second finger is expected. Once the user's second finger (or thumb) also touches the screen, the actual control corresponding to two-finger touch may be activated.

This approach may help a user to, for example, operate more complex controls on a touchscreen without need to look at the display. This approach also confirms to user that the correct control mode has been activated, thus decreasing potential confusion otherwise caused by small user error while initiating the touch.

Figure 9:
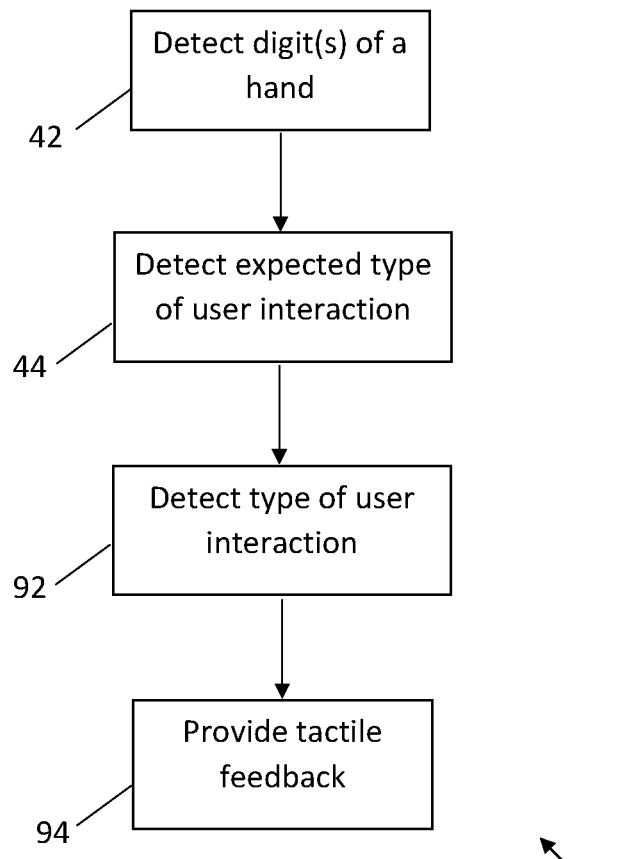
FIG. 9 is a flow chart showing an algorithm in accordance with an example embodiment.

FIG. 9 is a flow chart showing an algorithm, indicated generally by the reference numeral 90, in accordance with an example embodiment.

The algorithm 90 starts at operation 42, where, as discussed above, one or more digits (or some other part(s)) of a hand of a user within a first defined distance (e.g. a hover distance) of a touch sensitive tactile display are detected. Then, at the operation 44, a determination is made (based, at least in part, on the digits detected in the operation 42) of an expected type of user interaction with the display.

At operation 92, contact with the display by the hand of the user is detected and, based on the detected contact, a determination is made of a type of user interaction. As discussed further below, the type of user interaction determined in the operation 92 may be the same as, or different to, the expected type of user interaction detected in the operation 44.

Finally, at operation 94, tactile feedback is provided to the user.

The algorithm 90 differs from some implementations of the algorithm 40 described above in that the tactile feedback provided in the operation 94 is provided only on detection of contact by the hand with the display. Thus, no tactile feedback is provided by the operation 94 until contact with the display is made. This may be different to the operation 46 in which tactile feedback may be provided once the expected type of user interaction is detected in the operation 44 (although this is not essential to all implementation of the algorithm 40).

In some example embodiments, the expected type of user interaction detected in the operation 44 may be different to the actual type of user interaction detected in the operation 92. Such a scenario is described below with reference to FIGS. 10 and 11.

Figure 10:
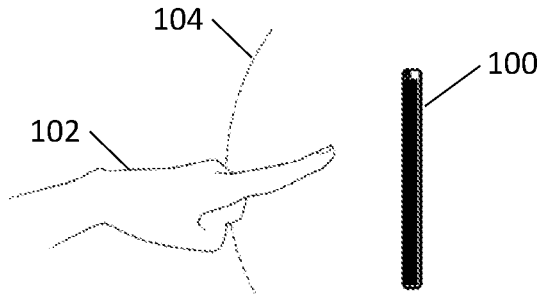
FIGS. 10 and 11 show a user device being used in accordance with example embodiments.
Figure 11:
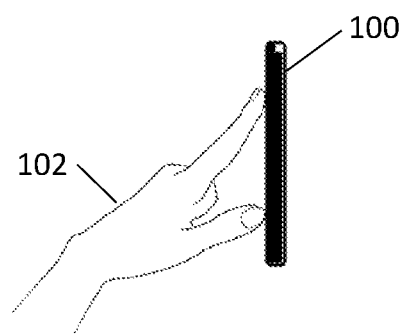

FIGS. 10 and 11 show a user device 100 being used in accordance with an example embodiment.

FIG. 10 shows a hand 102 of a user approaching the user device 100. The hand 102 has an extended forefinger, providing a one-finger/digit gesture. In an implementation of the operation 42, the extended forefinger (a digit of the user) is detected passing within a first defined distance 104 of a display of the user device. The first defined distance may be a "hover distance" as discussed elsewhere in this document. The display of the user device 100 may be a touch sensitive tactile display, such as a tactile audio display (TAD).

In response to the detection of the extended digit of the hand 102 in the operation 42, an incoming one-finger gesture is detected and an expected type of user interaction based on a one-finger contact is defined in the operation 44 accordingly.

As shown in FIG. 1i, the hand 102 of a user moves such that two fingers makes contact with the user device 100. There are a number of possibilities for dealing with this scenario, as discussed further below.

Figure 12:
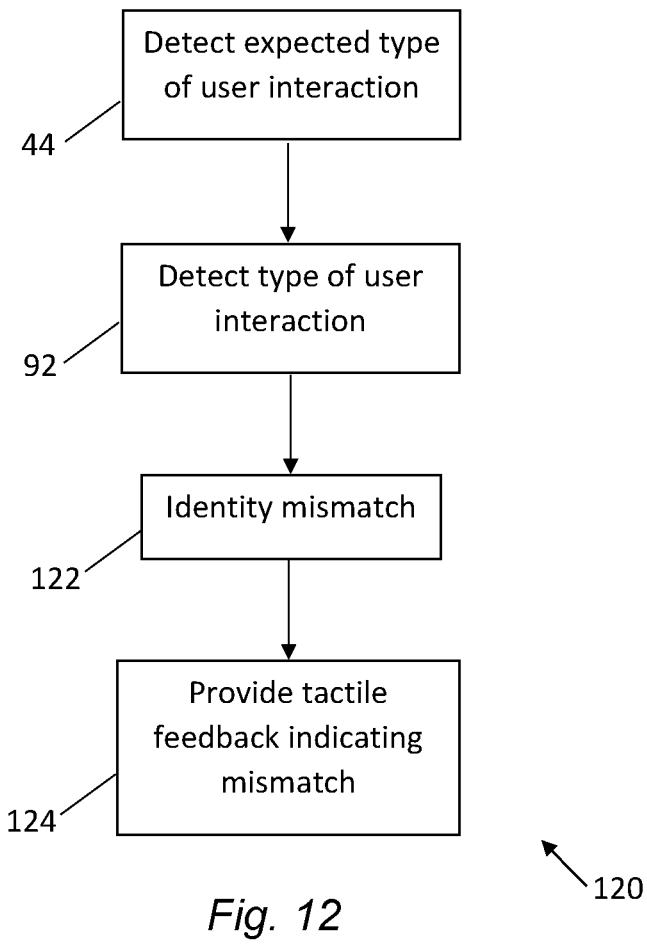
FIG. 12 is a flow chart showing an algorithm in accordance with an example embodiment.

FIG. 12 is a flow chart showing an algorithm, indicated generally by the reference numeral 120, in accordance with an example embodiment.

The algorithm 120 starts at operation 44, where a determination is made of an expected type of user interaction. As discussed above, the determination may be made based on the detection of one or more digits of a hand of a user within a first defined distance (e.g. a hover distance) of a touch sensitive tactile display are detected. By way of example, the single-finger gesture described above with reference to FIG. 10 may be detected such that the expected type of user interaction is a single-finger user interaction.

The algorithm 120 moves to operation 92, where contact with the display by the hand of the user (e.g. the hand 102) is detected and, based on the detected contact, a determination is made of a type of user interaction. In the example described above with reference to FIGS. 10 and 11, the type of user interaction detected in the operation 92 is different to the expected type of user interaction detected in the operation 44.

At operation 122 of the algorithm 120, the mismatch between the expected type of user interaction and the detected type of user interaction is detected. Then, at operation 124, tactile feedback is provided to the user indicative of a mismatch.

Figure 13:
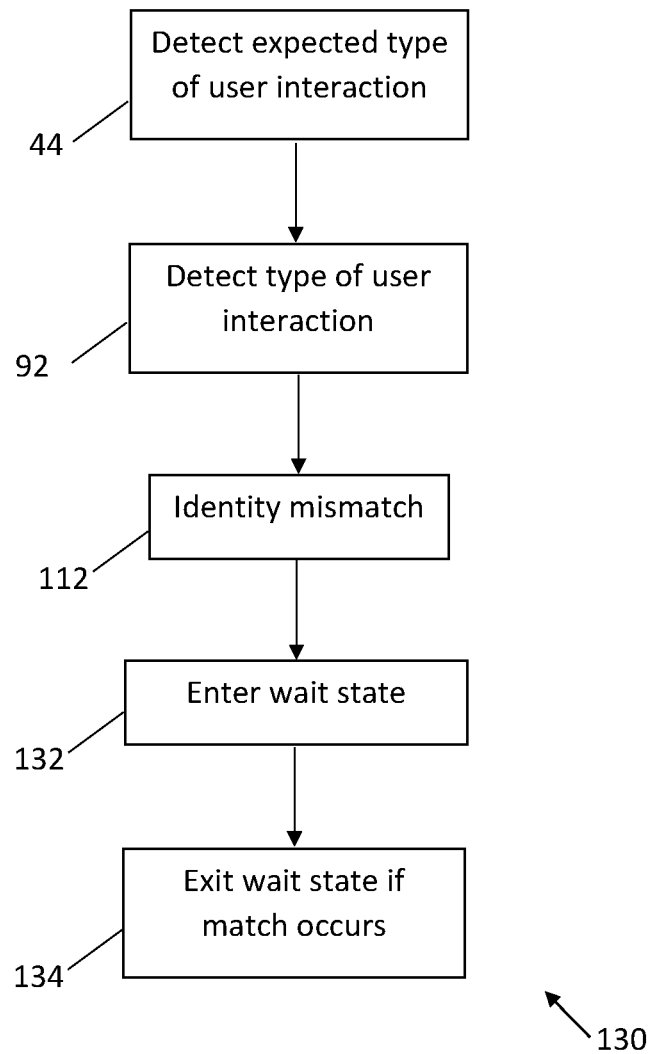
FIG. 13 is a flow chart showing an algorithm in accordance with an example embodiment.

FIG. 13 is a flow chart showing an algorithm, 130, in accordance with an example embodiment. The algorithm 130 shows an alternative approach to dealing with a mismatch between expected and detected types of user interaction.

The algorithm 130 starts at operation 44, where, in common with the algorithm 120, a determination is made of an expected type of user interaction. The algorithm 130 moves to operation 92, where, as discussed above, contact with the display by the hand of the user (e.g. the hand 102) is detected and, based on the detected contact, a determination is made of a type of user interaction. In the example described above with reference to FIGS. 10 and 11, a mismatch between the expected type of user interaction (a single-finger user interaction) and the actual type of user interaction (a two-digit user interaction) is detected.

In response to detecting (in the operation 112) that the determined type of user interaction does not match the expected type of user interaction, a wait state is entered in operation 132. In the operation 134, the algorithm 130 exits the wait state in the event that the determined type of user interaction changes to match the expected type of user interaction.

In some example embodiments, no tactile feedback is provided to the user in the wait state 132. In the event that the type of user interaction changes to match to expected type of user interaction (such that the wait state is exited), tactile feedback based on the expected (and actual) type of user interaction can be provided. In alternative embodiments, a tactile feedback based on the expected type of user interaction might be provided in the wait state 132. In a further alternative, a specific "wait state" feedback might be provided in the operation 132, such that the user can be informed that a mismatch has been identified.

Whilst in wait state 132, the functionality of the user device may be fixed (i.e. not changed based on the user gesture). This may, for example, prevent the user from accidentally change a setting based on an incorrect user input.

Figure 14:
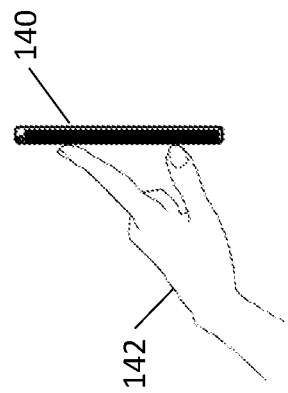
FIGS. 14 to 16 show a user device being used in accordance with an example embodiment.
Figure 15:
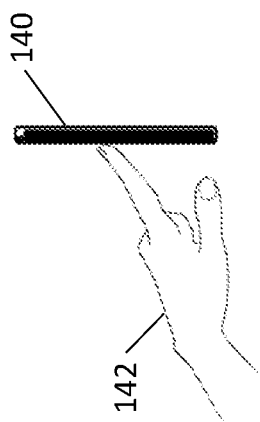
Figure 16:
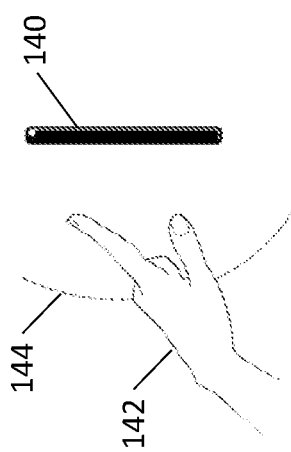

FIGS. 14 to 16 show a user device 140 being used in accordance with the algorithm 130.

FIG. 14 shows a hand 142 of a user approaching the user device 140. The hand 142 has an extended thumb and forefinger, providing a two-digit gesture. In response to the detection of the extended digits of the hand 142 (e.g. in response to the digits of the hand passing within a defined distance 144 of the device 140, such as within a "hover distance" as discussed elsewhere in this document), a two-digit gesture is detected and an expected type of user interaction based on a two-finger contact is defined in the operation 44 of the algorithm 130.

As shown in FIG. 15, the hand 142 of a user moves such that only one finger makes contact with the user device 140. Thus, a single finger gesture is detected in the operation 92.

As discussed above, a mismatch between the expected gestures of FIG. 14 and the actual gesture of FIG. 15 is detected and a wait state is entered (operations 112 and 132 of the algorithm 130).

If, as shown in FIG. 16, the user hand 142 of a user changes such that a two-digit gesture is provided, the algorithm 130 moves to the operation 134 such that the wait state is exited.

Figure 17:
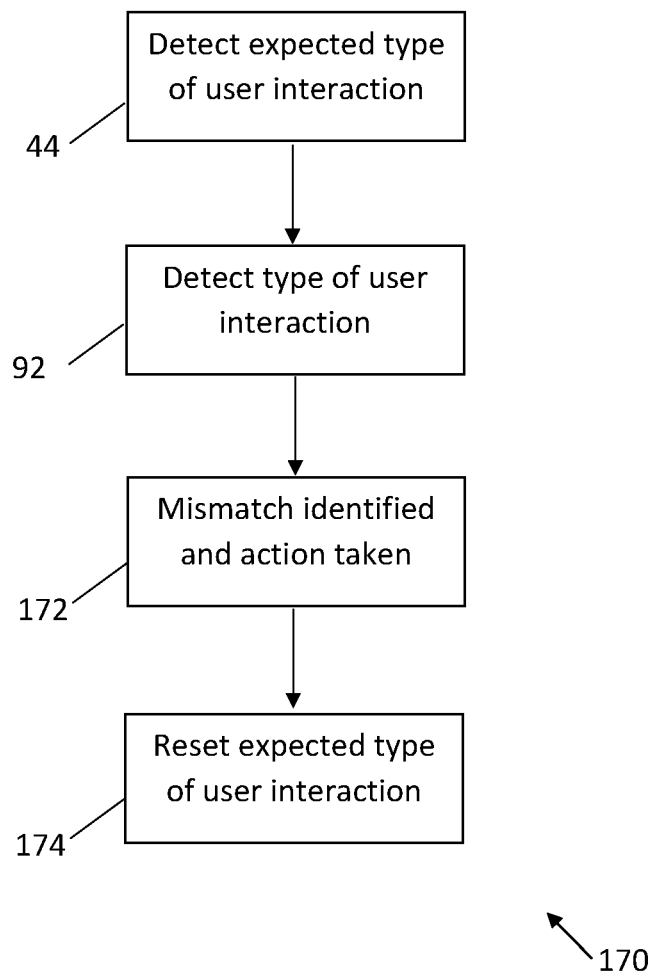
FIG. 17 is a flow chart showing an algorithm in accordance with an example embodiment.

FIG. 17 is a flow chart showing an algorithm, indicated generally by the reference numeral 170, in accordance with an example embodiment.

The algorithm 170 starts at operation 44, where, in common with the algorithms 120 and 130 described above, a determination is made of an expected type of user interaction. The algorithm 170 moves to operation 92, where, as discussed above, contact with the display by the hand of the user is detected and, based on the detected contact, a determination is made of a type of user interaction.

In operation 172, a mismatch between the types of user interaction detected in the operation 44 and 92 is detected and action is taken. The action may comprise providing tactile feedback indicating a mismatch (as in the operation 124 of the algorithm 120 described above), entering a wait state (as in the operation 132 of the algorithm 130 described above) or some other action.

In response to the mismatch, the algorithm 170 moves to operation 174, where the expected type of user interaction is reset. As described further below, in one example embodiment, the expected type of user interaction may be reset if it determined that the one or more digits of the hand of the user are moved to a position beyond a second defined distance (e.g. a "confirmation distance") from the touch sensitive tactile display. The confirmation distance may be closer to the tactile display than the hover distance. Thus, for example, the user can reset the expected user interaction by retreating and re-approaching the screen. In some alternative embodiments, the confirmation distance and the hover distance may be the same.

FIGS. 18 to 22 show a user device 180 being used in accordance with an example embodiment. The user device 180 is shown implementing the algorithm 170.

Figure 18:
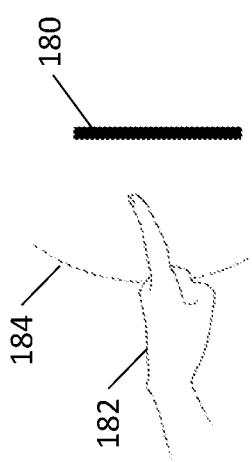

FIG. 18 shows a hand 182 of a user approaching the user device 180. The hand 182 has an extended forefinger, providing a one-digit gesture. In response to the detection of the extended digit of the hand 182 (e.g. in response to the extended forefinger passing within a defined distance 184 of the device 180, such as within a "hover distance" as discussed elsewhere in this document), a one-digit gesture is detected and an expected type of user interaction based on a one-finger contact is defined in the operation 44 of the algorithm 170.

Figure 19:
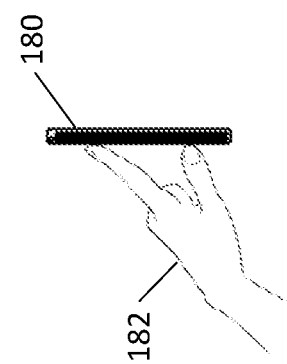

As shown in FIG. 19, the hand 182 of a user moves such that two digits make contact with the user device 180. Thus, a two-digit gesture is detected in the operation 92.

As discussed above, a mismatch between the expected gesture of FIG. 18 and the actual gesture on FIG. 19 is detected in the operation 172 of the algorithm 170.

Figure 20:
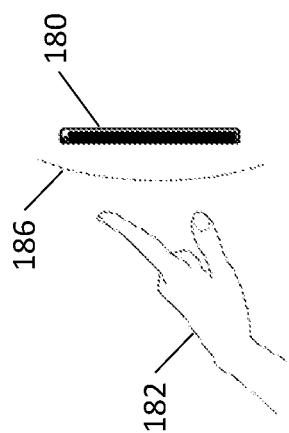

In response to the mismatch, the hand 182 of a user moves away from the user device 180 beyond a second define distance 186 (e.g. a confirmation distance) from the user device, as shown in FIG. 20. As a result, algorithm 170 moves to operation 174, where the expected type of user interaction is reset. Since the hand now has two extended digits, the expected type of user interaction is reset as a two-digit gesture.

Figure 21:
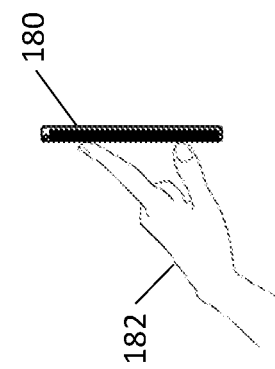
FIGS. 18 to 21 show a user device being used in accordance with an example embodiment.

As shown in FIG. 21, the user hand 182 moves again such that two digits make contact with the user device. This contact is now in accordance with the (revised) expected type of user interaction so that the normal operation of the system can proceed (e.g. tactile feedback may be provided as in the operations 46 and 94 described above).

Figure 22:
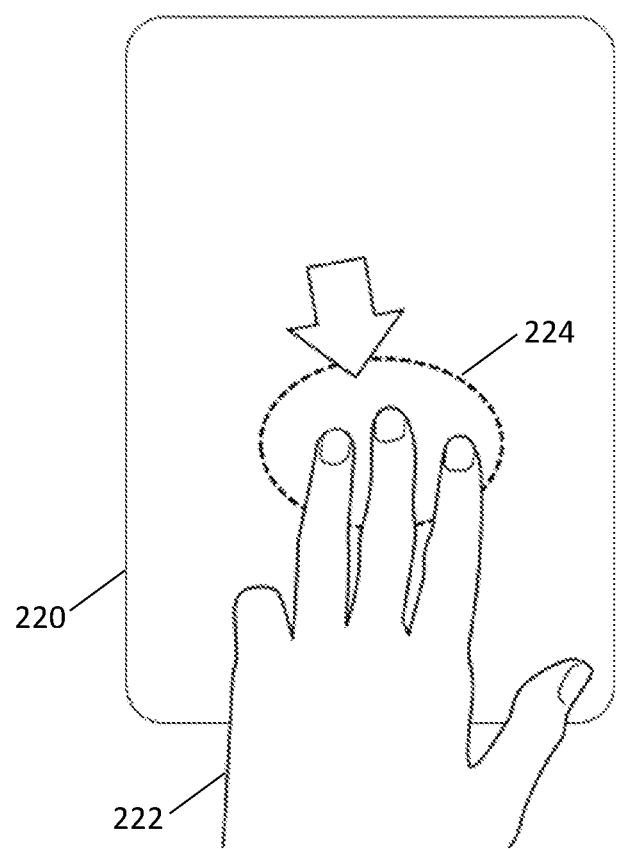
FIG. 22 shows a user device being used in accordance with an example embodiment.

The algorithms described above generally describe single-digit or two-digit gestures. Of course, many other gestures are possible. By way of example, FIG. 22 shows a user device 220 used in accordance with an example embodiment. A hand 222 of a user providing a three-finger gesture is shown that enables an image 224 displayed on the screen to be moved. The tactile feedback provided to the user in response to a three-finger gesture may be different to other gestures. For example, different tactile feedback may be provided of one-digit, two-digit and three-digit gestures.

There are many use cases where an application supports multi-finger inputs in which it may be useful to give the user feedback dependent on the intended operation. Examples of common inputs with multiple fingers include (but are not limited to):

Pinch zoom

Rotation

Moving web embedded content instead of scrolling a webpage (e.g., embedded map)

Simultaneous multiple object selection

Changing an application

Undo or redo functions.

The example embodiments described above generally refer to user fingers being used to interact with this display. However, in some alternative embodiments, contact may be made with the display using other parts of the hand (such as a side of the palm of the hand or the wrist of the hand).

Figure 23:
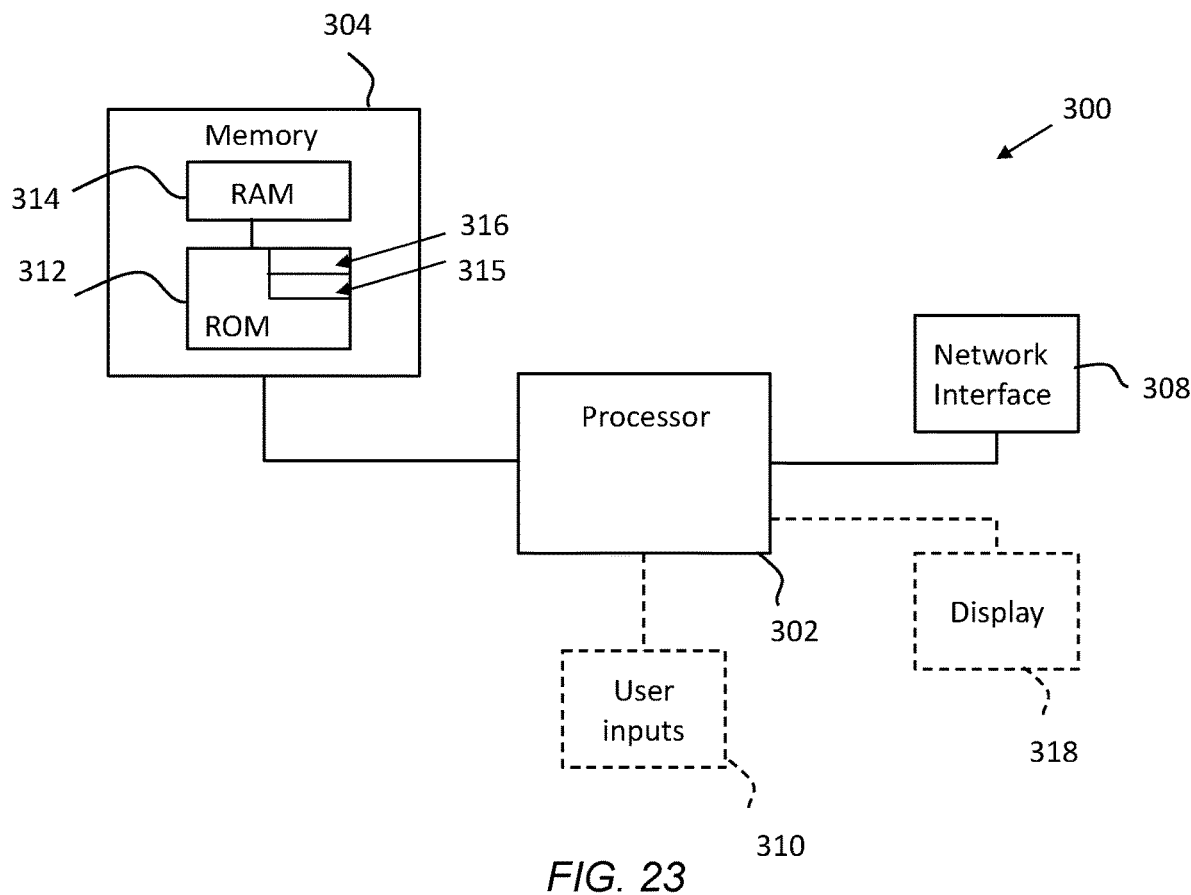
FIG. 23 is a block diagram of components of a system in accordance with an example embodiment.

For completeness, FIG. 23 is a schematic diagram of components of one or more of the example embodiments described previously, which hereafter are referred to generically as a processing system 300. The processing system 300 may, for example, be (or may include) the apparatus referred to in the claims below.

The processing system 300 may have a processor 302, a memory 304 coupled to the processor and comprised of a random access memory (RAM) 314 and a read only memory (ROM) 312, and, optionally, a user input 310 and a display 318. The processing system 300 may comprise one or more network/apparatus interfaces 308 for connection to a network/apparatus, e.g. a modem which may be wired or wireless. The network/apparatus interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the methods and algorithms 10, 40, 90, 120, 130 and 170 described above. Note that in the case of small device/apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 24:
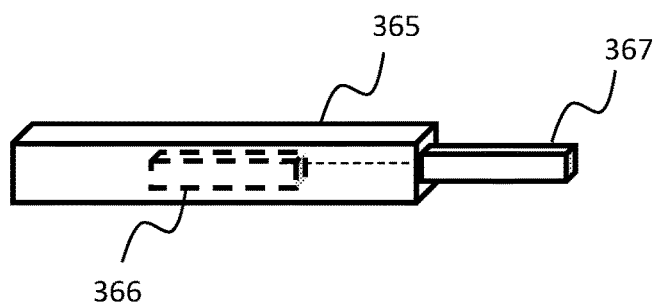
FIG. 24 shows an example of tangible media for storing computer-readable code which when run by a computer may perform methods according to example embodiments described above.

FIG. 24 shows tangible media, specifically a removable memory unit 365, storing computer-readable code which when run by a computer may perform methods according to example embodiments described above. The removable memory unit 365 may be a memory stick, e.g. a USB memory stick, having internal memory 366 for storing the computer-readable code. The internal memory 366 may be accessed by a computer system via a connector 367. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 1, 4, 9, 12, 13 and 17 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising:
    at least one processor; and
    at least one memory storing instructions that, when executed by the at least one processor, cause the apparatus at least to:
        detect a first one or more parts of a hand of a user within a first defined distance of a touch sensitive tactile display;
        detect a second one or more parts of a hand of the user within the first defined distance of the touch sensitive tactile display;
        determine based, at least in part, on the first one or more detected parts of the hand of the user, a first expected type of user interaction with the display, including determining a first expected number of parts of the hand that are expected to contact with the display as part of the first expected type of user interaction;
        determine based, at least in part, on the second one or more detected parts of the hand of the user, a second expected type of user interaction with the display, including determining a second expected number of parts of the hand that are expected to contact with the display as part of the second expected type of user interaction; and
        provide tactile feedback to the user based on the first expected type of user interaction and the second expected type of user interaction when the user makes contact with the display dependent on the first expected type of user interaction and before a contact based on the second expected type of user interaction.

2. The apparatus as claimed in claim 1, further caused to:
    detect contact with the display by the hand of the user; and
    determine a type of user interaction of the detected contact.

3. The apparatus as claimed in claim 2, wherein the providing tactile feedback is configured to provide said tactile feedback in response to the detection of contact with the display by the hand of the user.

4. The apparatus as claimed in claim 2, wherein the providing tactile feedback to the user is caused to provide tactile feedback in the event that the first expected type of user interaction matches the first determined type of user interaction.

5. The apparatus as claimed in claim 2, wherein the providing tactile feedback to the user is caused to provide tactile feedback indicative of a mismatch in the event that the first determined type of user interaction does not match the first expected type of user interaction.

6. The apparatus as claimed in claim 2, further caused to enter a wait state in the event that the first determined type of user interaction does not match the first expected type of user interaction.

7. The apparatus as claimed in claim 6, further caused to exit the wait state in the event that the first determined type of user interaction changes to match the first expected type of user interaction.

8. The apparatus as claimed in claim 6, wherein no tactile feedback is provided to the user in the wait state.

9. The apparatus as claimed in claim 1, further caused to reset the expected type of user interaction.

10. The apparatus as claimed in claim 9, wherein the resetting the expected type of user interaction comprises determine that the first one or more parts of the hand of the user are positioned beyond a second defined distance from the touch sensitive tactile display.

11. The apparatus as claimed in claim 1, wherein the type of user interaction relates to a control function.

12. The apparatus as claimed in claim 1, wherein the detecting of the first one or more parts of the hand of the user within the first defined distance of the touch sensitive tactile display comprises use of one or more of:
    at least one a hover sensor;
    at least one LIDAR sensor;
    at least one millimetre wave sensor; or
    at least one camera.

13. The apparatus as claimed in claim 1, wherein said first one or more parts of the hand of the user comprise one or more digits of the hand of the user.

14. A method comprising:
    detecting a first one or more parts of a hand of a user within a first defined distance of a touch sensitive tactile display;
    detecting a second one or more parts of a hand of the user within the first defined distance of the touch sensitive tactile display;
    determining based, at least in part, on the first one or more detected parts of the hand of the user, a first expected type of user interaction with the display, including determining a first expected number of parts of the hand that are expected to contact with the display as part of the first expected type of user interaction;
    determining based, at least in part, on the second one or more detected parts of the hand of the user, a second expected type of user interaction with the display, including determining a second expected number of parts of the hand that are expected to contact with the display as part of the second expected type of user interaction; and
    providing tactile feedback to the user based on the first expected type of user interaction and the second expected type of user interaction when the user makes contact with the display dependent on the first expected type of user interaction and before a contact based on the second expected type of user interaction.

15. The method as claimed in claim 14, further comprising:
    detecting contact with the display by the hand of the user; and
    determining a type of user interaction of the detected contact.

16. The method as claimed in claim 15, wherein the providing tactile feedback is configured to provide said tactile feedback in response to the detection of contact with the display by the hand of the user.

17. The method as claimed in claim 15, wherein the providing tactile feedback to the user is caused to provide tactile feedback in the event that the first expected type of user interaction matches the first determined type of user interaction.

18. The method as claimed in claim 15, wherein the providing tactile feedback to the user is configured to provide tactile feedback indicative of a mismatch in the event that the first determined type of user interaction does not match the first expected type of user interaction.

19. The method as claimed in claim 15, further caused to enter a wait state in the event that the first determined type of user interaction does not match the first expected type of user interaction.

20. A non-transitory computer readable medium comprising program instructions stored thereon for performing at least the following:
- detect a first one or more parts of a hand of a user within a first defined distance of a touch sensitive tactile display;
- detect a second one or more parts of a hand of the user within the first defined distance of the touch sensitive tactile display;
- determine based, at least in part, on the first one or more detected parts of the hand of the user, a first expected type of user interaction with the display, including determining a first expected number of parts of the hand that are expected to contact with the display as part of the first expected type of user interaction;
- determine based, at least in part, on the second one or more detected parts of the hand of the user, a second expected type of user interaction with the display, including determining a second expected number of parts of the hand that are expected to contact with the display as part of the second expected type of user interaction; and
- provide tactile feedback to the user based on the first expected type of user interaction and the second expected type of user interaction when the user makes contact with the display dependent on the first expected type of user interaction and before a contact based on the second expected type of user interaction.

* * * * *